(12) United States Patent
Ploch

(10) Patent No.: US 12,221,016 B2
(45) Date of Patent: Feb. 11, 2025

(54) SEAT ASSEMBLY WITH OVERRIDE CONDITION

(71) Applicant: Magna Seating Inc, Aurora (CA)

(72) Inventor: Steven Ploch, White Lake, MI (US)

(73) Assignee: Magna Seating Inc., Aurora (CA)

( * ) Notice: Subject to any disclaimer, the term of this patent is extended or adjusted under 35 U.S.C. 154(b) by 110 days.

(21) Appl. No.: 18/003,328

(22) PCT Filed: Jun. 25, 2021

(86) PCT No.: PCT/US2021/039086
§ 371 (c)(1),
(2) Date: Dec. 26, 2022

(87) PCT Pub. No.: WO2021/263103
PCT Pub. Date: Dec. 30, 2021

(65) Prior Publication Data
US 2023/0249586 A1 Aug. 10, 2023

Related U.S. Application Data

(60) Provisional application No. 62/705,392, filed on Jun. 25, 2020.

(51) Int. Cl.
*B60N 2/02* (2006.01)
*B60N 2/04* (2006.01)
*B60N 2/12* (2006.01)

(52) U.S. Cl.
CPC ......... *B60N 2/02246* (2023.08); *B60N 2/045* (2013.01); *B60N 2/12* (2013.01); *B60N 2/02253* (2023.08)

(58) Field of Classification Search
CPC .................... A47C 1/0242; A47C 1/03211
USPC .................................................. 297/330, 325
See application file for complete search history.

(56) References Cited

U.S. PATENT DOCUMENTS

| | | | | |
|---|---|---|---|---|
| 4,513,937 A | * | 4/1985 | Langmesser, Jr. | ... B60N 2/1892 248/394 |
| 4,979,773 A | * | 12/1990 | Eubank | ... B60N 2/045 296/65.09 |
| 5,472,165 A | * | 12/1995 | Gruber | ... B60N 2/1685 248/424 |

(Continued)

FOREIGN PATENT DOCUMENTS

| | | |
|---|---|---|
| EP | 1882609 | 1/2008 |
| FR | 3086599 | 4/2020 |

*Primary Examiner* — Jose V Chen
(74) *Attorney, Agent, or Firm* — Miller Canfield

(57) ABSTRACT

A seat assembly for use in an automotive vehicle includes a seat back pivotally coupled to a seat cushion and at least one link pivotally coupled between the seat cushion and a seat base. A detent assembly is rotatably coupled to the seat base, the detent assembly actuatable between a use condition for operatively coupling the at least one link and the detent assembly, and an override condition for decoupling the at least one link and the detent assembly. A linkage motor is operatively engaged with the detent assembly for pivoting the at least one link to move the seat assembly between a plurality of positions. Actuation of the detent assembly from the use condition to the override condition allows for manual pivoting of the at least one link to move the seat assembly between the plurality of positions in situations where the linkage motor is unable to be actuated.

17 Claims, 12 Drawing Sheets

(56) References Cited

U.S. PATENT DOCUMENTS

| | | | | |
|---|---|---|---|---|
| 5,664,755 | A * | 9/1997 | Gruber | B60N 2/045 |
| | | | | 248/419 |
| 5,931,533 | A * | 8/1999 | Lance | B60N 2/163 |
| | | | | 248/404 |
| 7,780,230 | B2 * | 8/2010 | Serber | B60N 2/0745 |
| | | | | 297/216.19 |
| 2011/0221249 | A1 * | 9/2011 | Flesch | B60N 2/2254 |
| | | | | 297/362 |
| 2016/0186468 | A1 * | 6/2016 | Ilea | E05B 79/20 |
| | | | | 292/201 |
| 2017/0166092 | A1 * | 6/2017 | Ploch | B60N 2/20 |
| 2019/0152352 | A1 | 5/2019 | Handigol et al. | |
| 2019/0381913 | A1 * | 12/2019 | Banales Cano | B60N 2/0224 |
| 2020/0101872 | A1 | 4/2020 | Epaud et al. | |
| 2021/0237627 | A1 * | 8/2021 | Lesbats | B60N 2/3045 |

\* cited by examiner

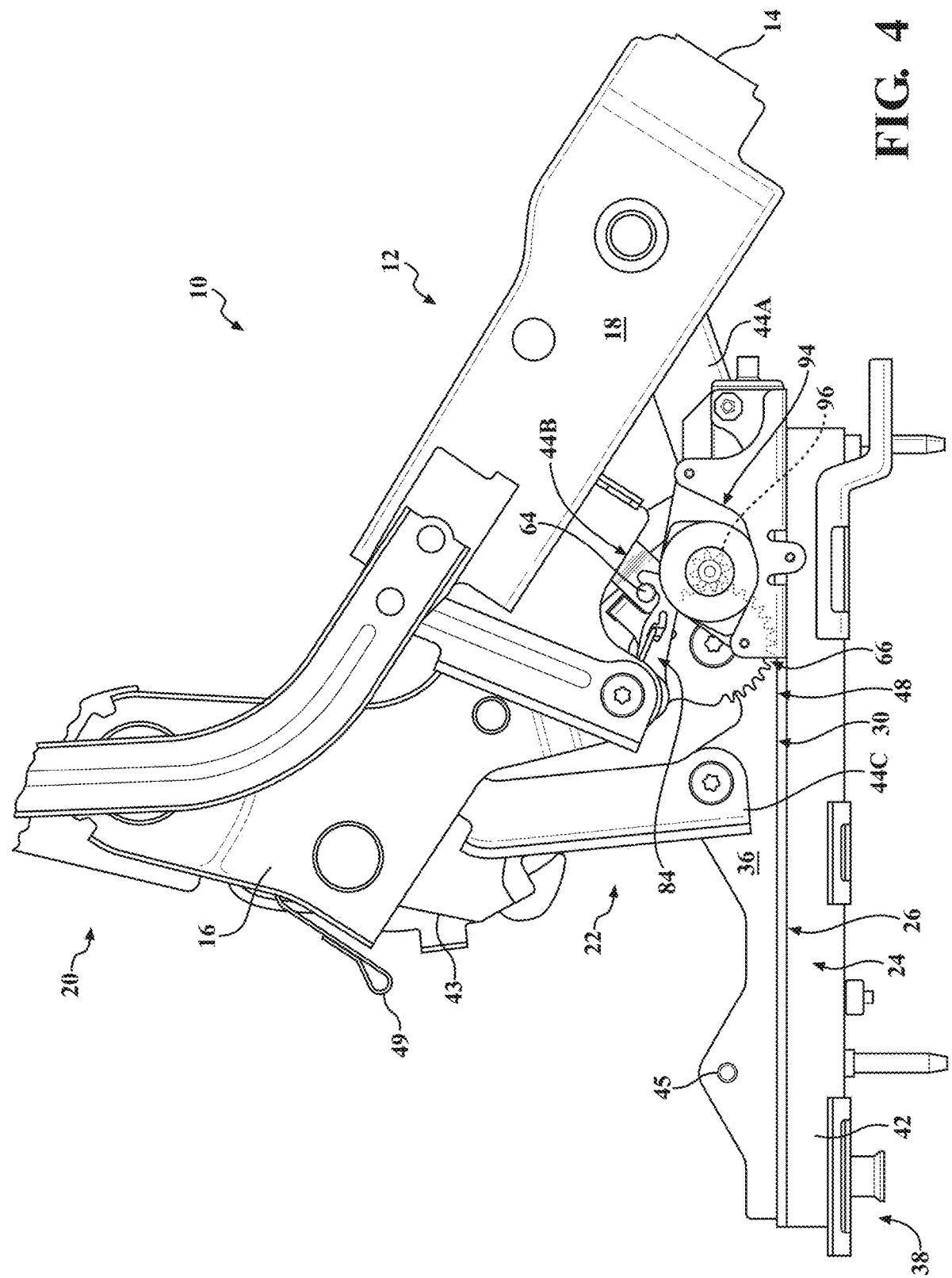

SEAT ASSEMBLY WITH OVERRIDE CONDITION

CROSS-REFERENCE TO RELATED APPLICATIONS

This application claims priority to and all the benefits of U.S. Provisional Application 62/705,392, filed on Jun. 25, 2020, and entitled "Seat Assembly with Power Pitch Easy Entry and Emergency Exit Override," the disclosure of which is hereby incorporated by reference in its entirety.

BACKGROUND OF THE INVENTION

1. Field of the Invention

The present invention relates to a seat assembly for use in an automotive vehicle.

2. Description of Related Art

Seat assemblies for use in an automotive vehicle are known in the art. Typical seat assemblies include a seat cushion for supporting an occupant in the automotive vehicle and a seat back pivotally coupled to the seat cushion. The seat assemblies also typically include a seat base adapted for mounting the seat assembly within the automotive vehicle. At least one link is pivotally coupled between the seat cushion and the seat base, and pivoting of the at least one link moves the seat assembly between at least a design position and a pitch position. A motor is often operatively engaged with the at least one link to move the seat assembly between the design position and the pitch position. However, the motor typically remains engaged with the at least one link when power to the seat assembly is interrupted, effectively locking the at least one link. Therefore, an occupant may be prevented from moving the seat assembly between the design position and the pitch position until power is restored to the seat assembly and the motor can again be actuated.

SUMMARY OF THE INVENTION

According to one aspect of the invention, a seat assembly is provided for use in an automotive vehicle. The seat assembly includes a seat cushion for supporting an occupant in the automotive vehicle and a seat back pivotally coupled to the seat cushion. The seat assembly further includes a seat base adapted for mounting the seat assembly within the automotive vehicle. At least one link is pivotally coupled between the seat cushion and the seat base, and pivoting of the at least one link moves the seat assembly between a design position and a pitch position. A detent assembly is rotatably coupled to the seat base, and the detent assembly is actuatable between a use condition for operatively coupling the at least one link and the detent assembly, and an override condition for decoupling the at least one link and the detent assembly. A linkage motor is operatively engaged with the detent assembly for pivoting the at least one link to move the seat assembly between the design position and the pitch position. Actuation of the detent assembly from the use condition to the override condition allows for manual pivoting of the at least one link to move the seat assembly between the design position and the pitch position independently of the detent assembly and without actuation of the linkage motor.

BRIEF DESCRIPTION OF THE DRAWINGS

Advantages of the present disclosure will be readily appreciated as the same becomes better understood by reference to the following detailed description when considered in connection with the accompanying drawings, wherein:

FIG. 4 is a fragmentary side view of the seat assembly of FIG. 1 further showing the seat assembly in the pitch position;

DETAILED DESCRIPTION OF THE EMBODIMENTS

Figure 1:
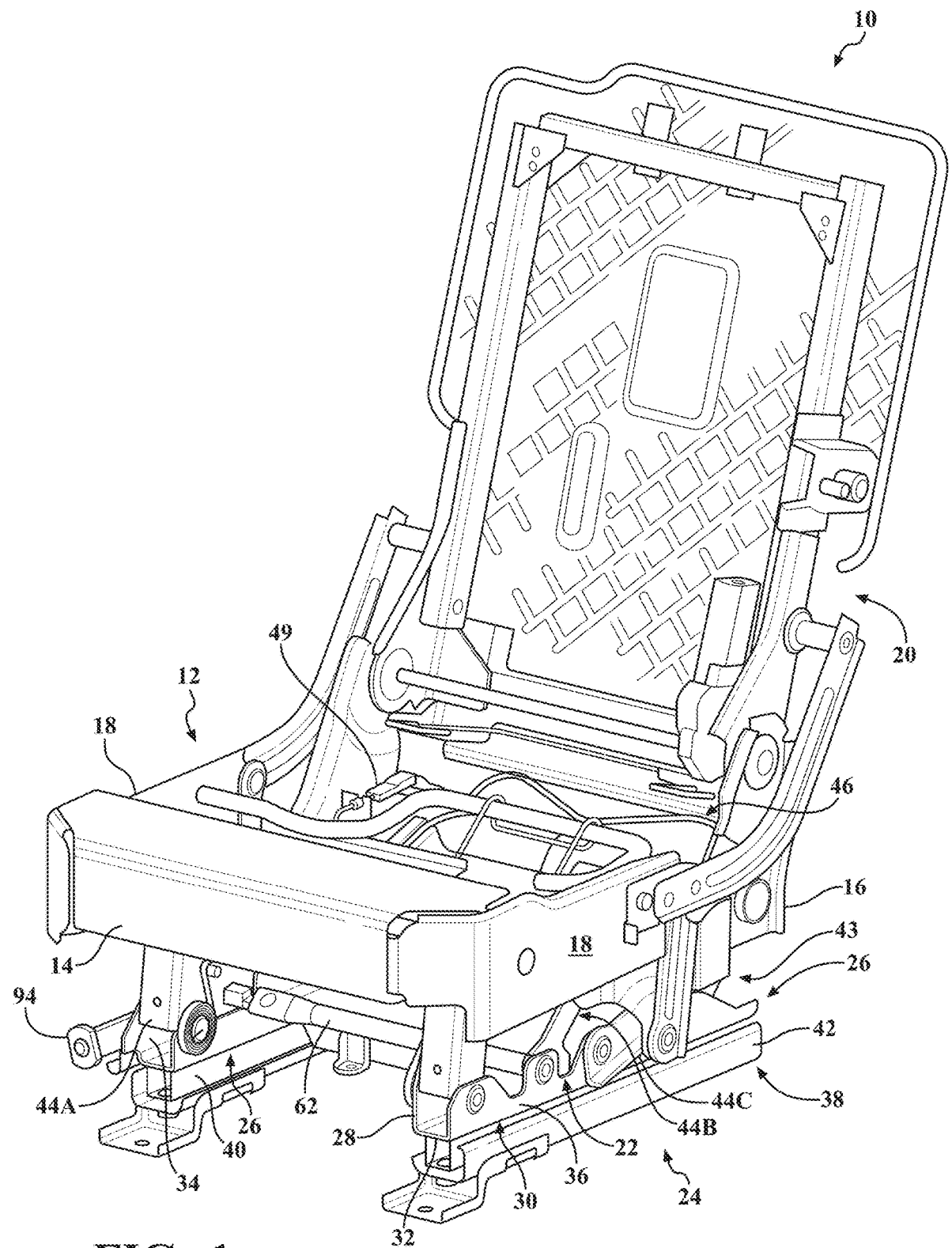
FIG. 1 is a perspective view of a seat assembly for use in an automotive vehicle according to a first embodiment of the present invention showing the seat assembly in a design position.
Figure 2:
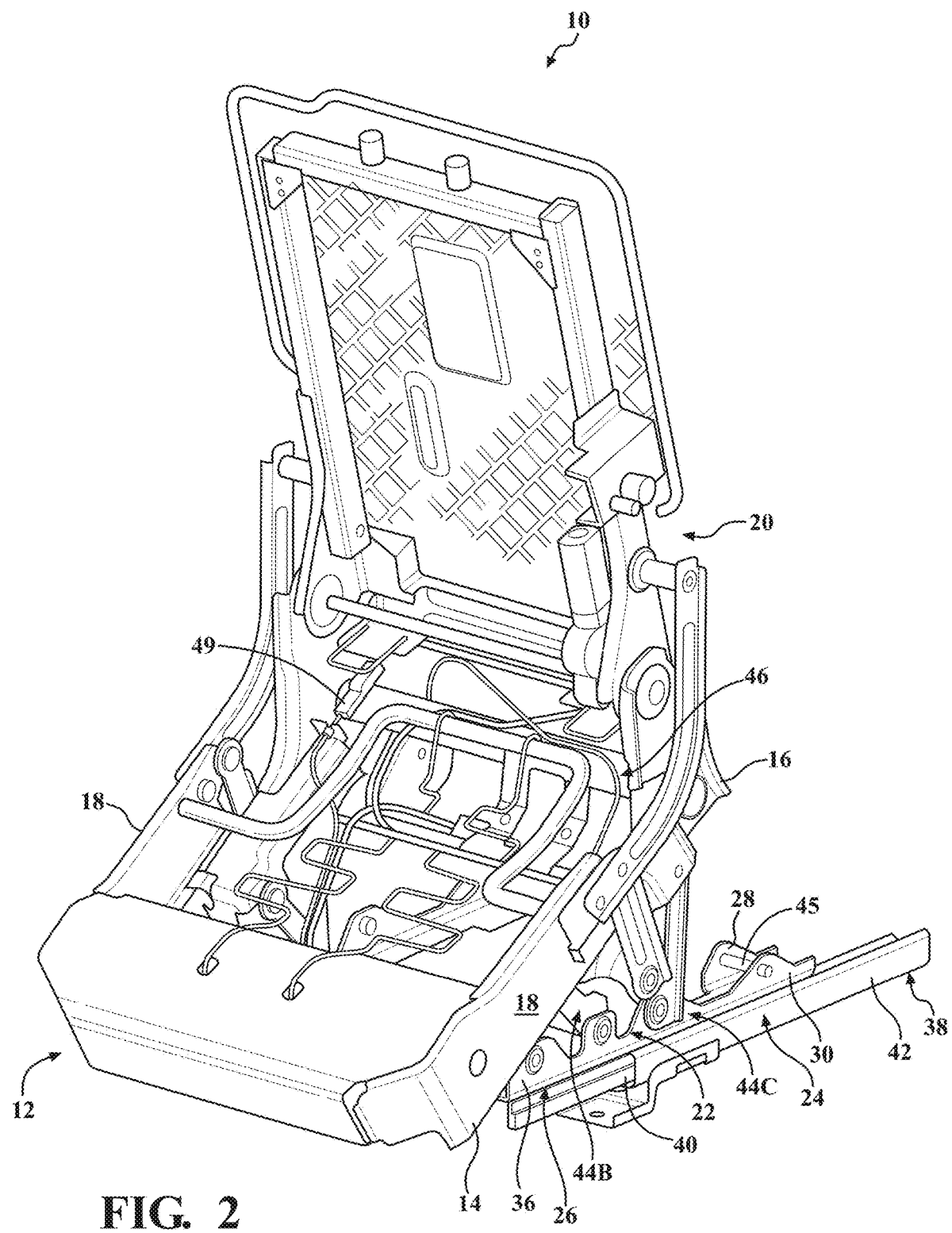
FIG. 2 is a perspective view of the seat assembly of FIG. 1 showing the seat assembly in a pitch position.
Figure 3:
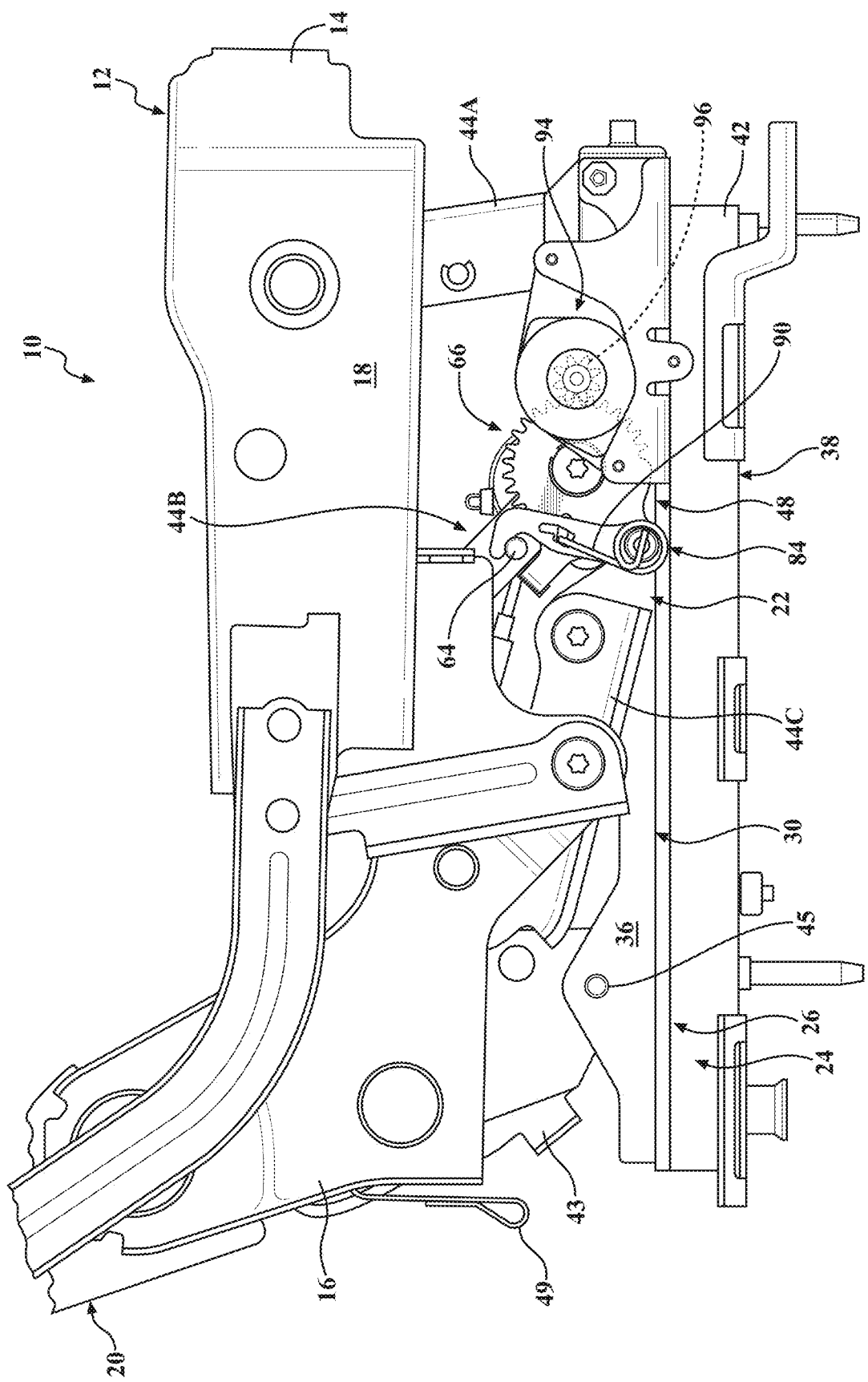
FIG. 3 is a fragmentary side view of the seat assembly of FIG. 1 further showing the seat assembly in the design position.

Referring to the Figures, wherein like numerals indicate like or corresponding parts throughout the several views, a seat assembly adapted to be mounted to a floor of an automotive vehicle for movement between a plurality of positions is shown generally at 10. The seat assembly 10 includes a seat cushion 12 extending between a front portion 14 and a rear portion 16 with opposing lateral sides 18. A seat back 20 is pivotally coupled to the rear portion 16 of the seat cushion 12 for pivotal movement of the seat back 20 between a plurality of reclined positions and a folded position in which the seat back 20 overlaps the seat cushion 12. The seat assembly 10 further includes a linkage assembly, shown generally at 22, operatively coupled between the seat cushion 12 and a seat base 24. The linkage assembly 22 is operable for moving and tilting the seat assembly 10 relative to the floor of the automotive vehicle between the plurality of positions, including a design position, as shown in FIGS. 1 and 3, and a pitch position, as shown in FIGS. 2 and 4.

Referring to FIGS. 1-4, the seat base 24 includes a pair of laterally spaced apart side sections 26, each side section 26 positioned generally underneath one of the respective lateral sides 18 of the seat cushion 12. The side sections 26 may be fixedly coupled together, and each side section 26 has a generally U-shaped cross-sectional profile defined by opposing inner and outer walls 28, 30 and a floor portion 32 extending therebetween. The outer wall 30 on each side section 26 has a medial, inward-facing side 34 opposite a lateral, outward-facing side 36. The side sections 26 of the seat base 24 may be mounted directly to the floor of the automotive vehicle or fixedly coupled to a seat track assembly 38 as is known in the art for providing fore and aft movement of the seat assembly 10 within the automotive vehicle, as shown in the Figures. The seat track assembly 38 includes a pair of sliding tracks 40 fixedly coupled to the seat base 24, the sliding tracks 40 repositionable along a pair of laterally spaced apart fixed tracks 42 mounted to the floor of the automotive vehicle. The floor portion 32 on each side section 26 is secured to the respective sliding track 40 for coupling the seat base 24 to the seat track assembly 38 and providing fore and aft sliding movement of the seat assembly 10 within the automotive vehicle.

The linkage assembly 22 in the embodiment of the seat assembly 10 shown in the Figures includes a pair of laterally spaced apart front links 44A, a pair of laterally spaced apart intermediate links 44B, and a pair of laterally spaced apart rear links 44C, wherein the links 44A, 44B, 44C in each corresponding link pair are substantially the same. However, it is to be appreciated that the seat assembly 10 can include any number or configuration of links 44A, 44B, 44C in the linkage assembly 22 to optimize the seat assembly 10 for use in a particular seating environment within a particular vehicle without varying the scope of the invention. One such alternative linkage assembly 22 is a four-bar linkage having a pair of laterally spaced apart front links and a pair of laterally spaced apart rear links as described in International Publication WO/2020/132153, the disclosure of which is hereby incorporated by reference in its entirety. Referring to FIGS. 3 and 4, each of the links 44A, 44B, 44C in the linkage assembly 22 are operatively coupled between the side sections 26 of the seat base 24 and the seat cushion 12 as is known in the art. The links 44A, 44B, 44C in the linkage assembly 22 are pivotable for moving and tilting the seat assembly 10 relative to the floor of the automotive vehicle between at least the design position and the pitch position. In the design position, shown in FIGS. 1 and 3, the seat assembly 10 is generally spaced from the floor of the automotive vehicle to support an occupant. In the pitch position, shown in FIGS. 2 and 4, the seat assembly 10 tilts forwardly and downwardly toward the floor of the automotive vehicle for increased ingress and egress behind the seat assembly 10. Additional seating positions, including a stow position where the seat assembly 10 lowers toward the floor of the automotive vehicle for increased cargo room therein, are also contemplated with respect to the embodiment of the seat assembly 10 as shown in the Figures.

Figure 6:
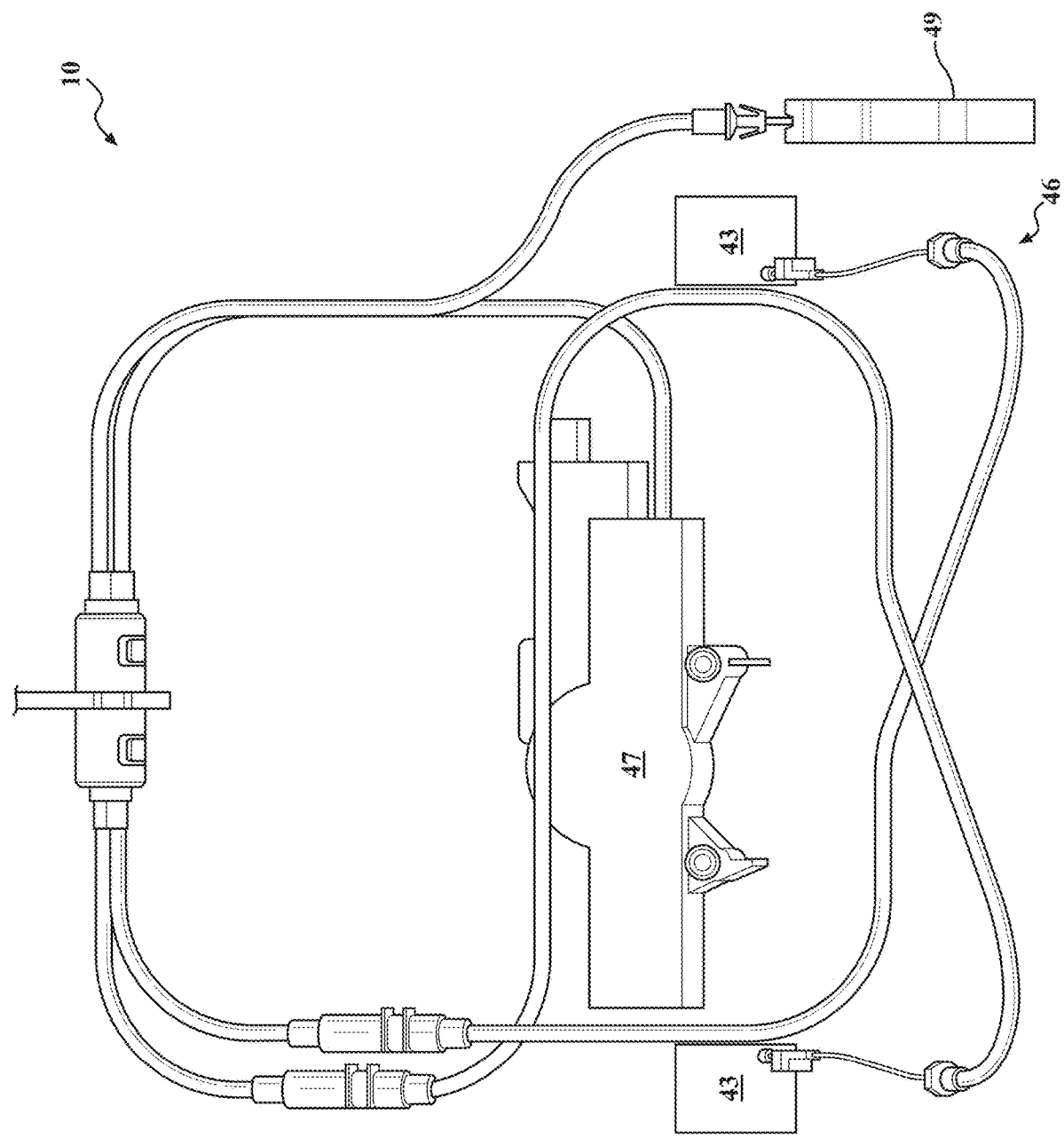
FIG. 6 is a fragmentary top view of a cable assembly of the seat assembly of FIG. 1.
Figure 7:
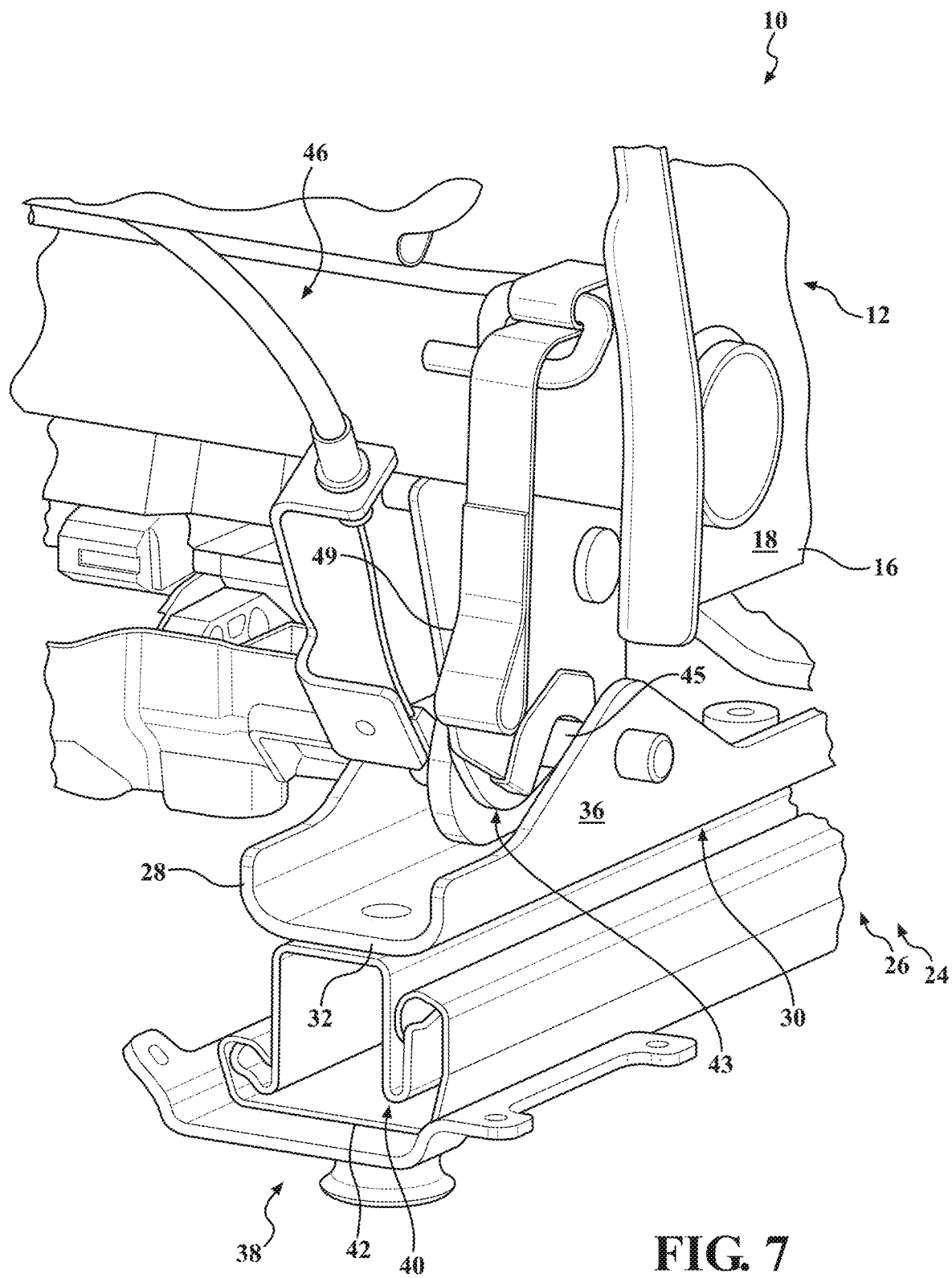
FIG. 7 is an enlarged fragmentary perspective view of the seat assembly of FIG. 1 showing a pull strap operatively coupled to a rear portion of a seat cushion.

Pivoting the links 44A, 44B, 44C in the linkage assembly 22 in a first direction (clockwise when viewed from FIGS. 3-5B) moves the seat assembly 10 from the design position to the pitch position. Conversely, pivoting of the links 44A, 44B, 44C in the linkage assembly 22 in a second direction (counterclockwise when viewed from FIGS. 3-5B) moves the seat assembly 10 from the pitch position back to the design position. Referring to FIGS. 1-4, the seat assembly 10 further includes a latching mechanism 43 extending downwardly from the rear portion 16 on each lateral side 18 of the seat cushion 12, and a striker 45 mounted between the inner and outer walls 28, 30 on the side sections 26 of the seat base 24. The latching mechanisms 43 are adapted and arranged for removably coupling to the strikers 45 as is known in the art for selectively locking and preventing pivoting of the links 44A, 44B, 44C in the linkage assembly 22, thereby locking and retaining the seat assembly 10 in the design position as desired by the occupant. Referring to FIG. 6, a conventional cable assembly, shown generally at 46, is mounted underneath the seat cushion 12 and extends between each of the latching mechanisms 43. An actuator 47 is integrated into the cable assembly 46 for electromechanically actuating and selectively unlocking the latching mechanisms 43 during normal operation of the seat assembly 10, as is known in the art. The cable assembly 46 additionally includes a pull strap 49 operatively coupled generally adjacent to the rear portion 16 of the seat cushion 12 for manually actuating and unlocking the latching mechanisms 43 during a loss of power to the seat assembly 10 and the actuator 47, as shown in FIGS. 6 and 7.

Figure 8:
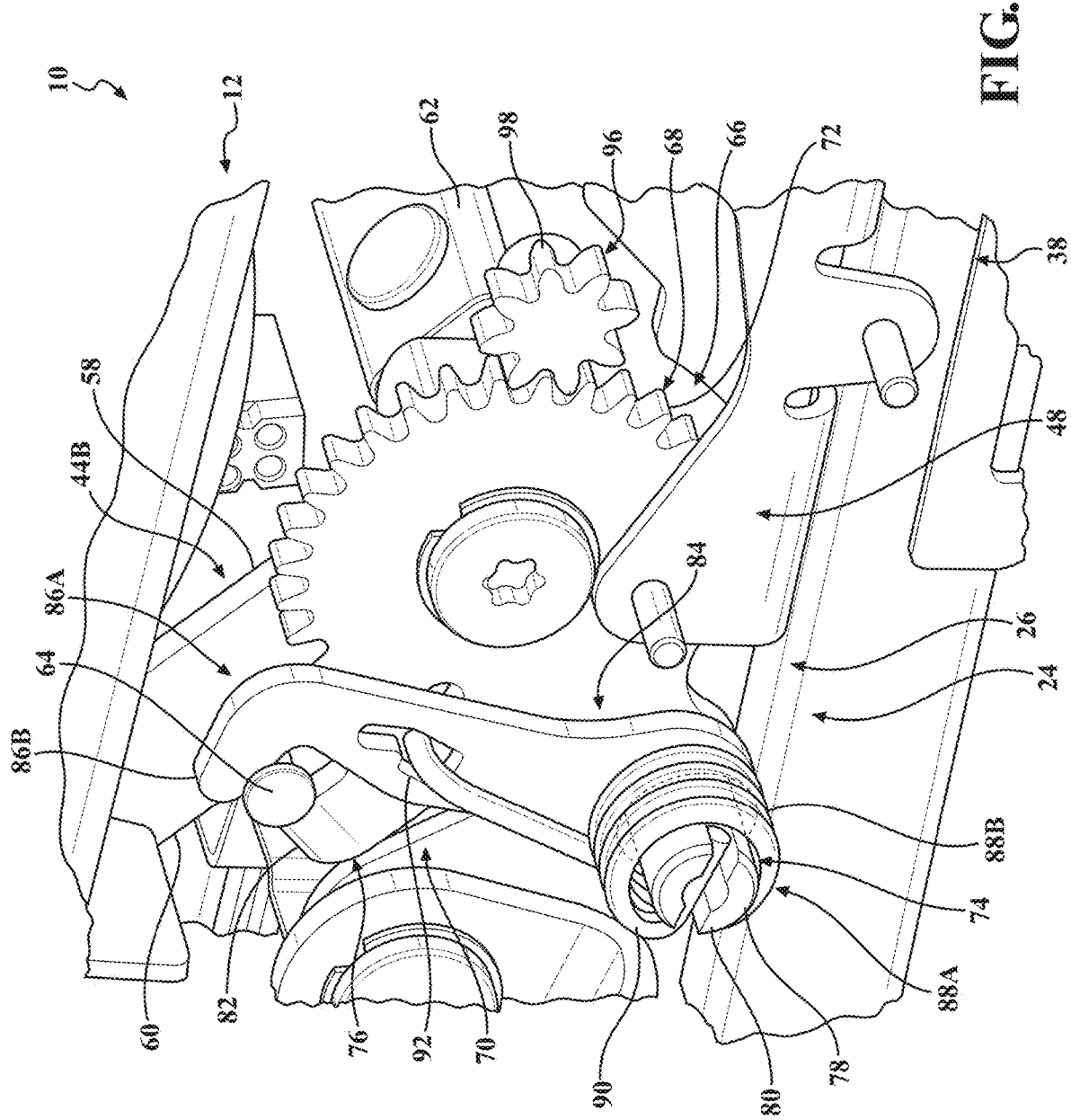
FIG. 8 is an enlarged fragmentary perspective view of the seat assembly of FIG. 1 showing a hook element pivotally coupled to a sector gear of the detent assembly.
Figure 9A:
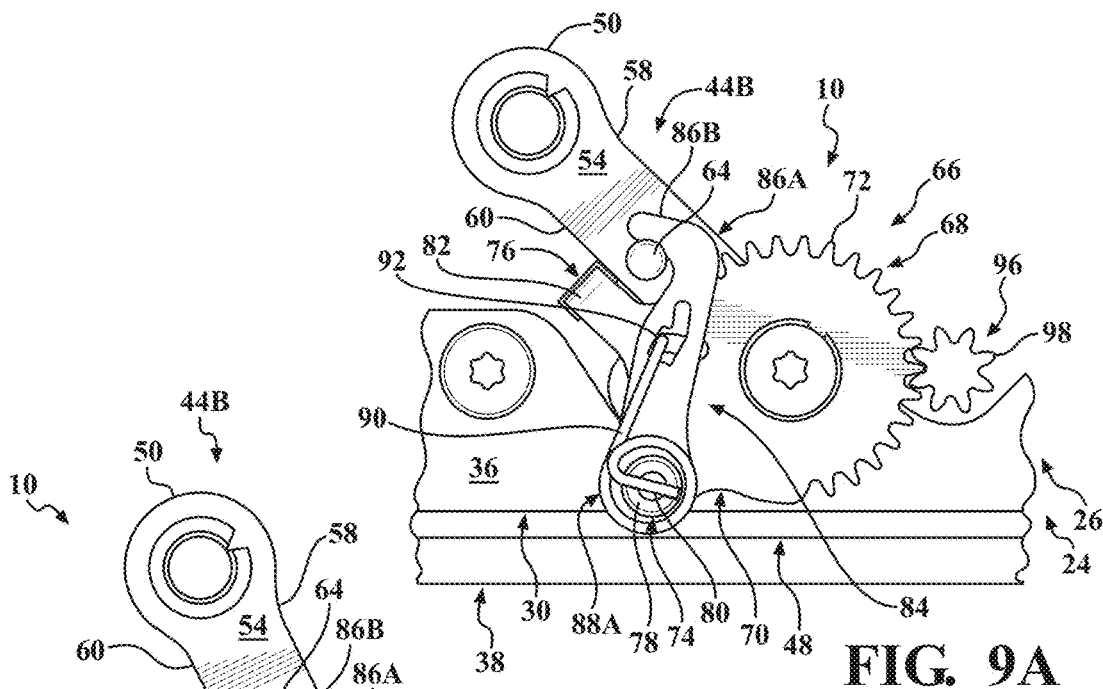
FIG. 9A is an enlarged fragmentary side view of the seat assembly of FIG. 1 showing the detent assembly in a use condition.
Figure 9B:
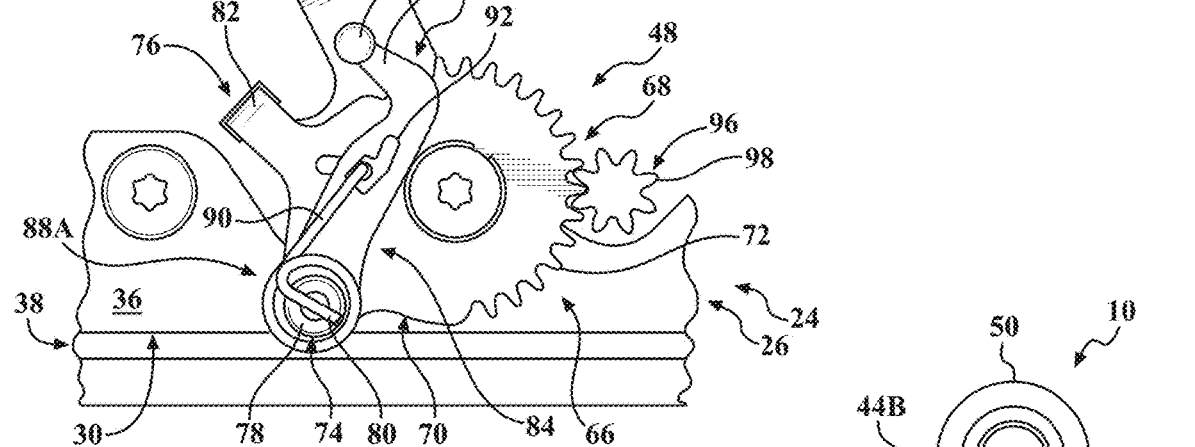
FIG. 9B is an enlarged fragmentary side view of the seat assembly of FIG. 1 showing the detent assembly disposed between the use condition and an override condition.
Figure 9C:
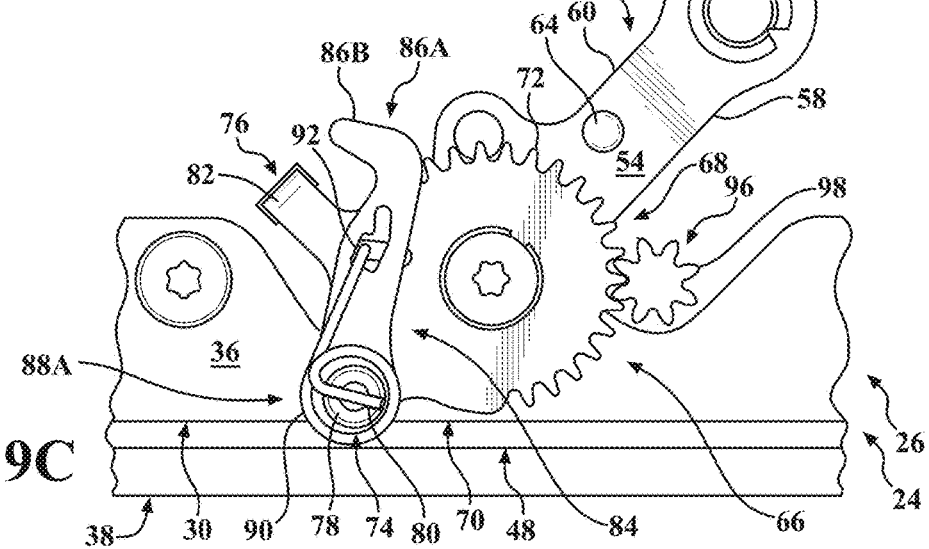
FIG. 9C is an enlarged fragmentary side view of the seat assembly of FIG. 1 showing the detent assembly in the override condition.

Referring to FIGS. 3, 8, and 9A-9C, the seat assembly 10 further includes a detent assembly 48 operatively coupled to the seat base 24 and arranged for selectively engaging and coupling with the intermediate link 44B of the linkage assembly 22. The detent assembly 48 is actuatable between a use condition, as shown in FIGS. 5A, 5B, 8, and 9A, for operatively coupling the intermediate link 44B and the detent assembly 48, and an override condition, as shown in FIG. 9C, for decoupling the intermediate link 44B and the detent assembly 48, thereby allowing pivoting of the intermediate link 44B and the linkage assembly 22 independently of the detent assembly 48. Although the detent assembly 48 as shown in the Figures is arranged to selectively engage the intermediate link 44B, it is to be appreciated that the detent assembly 48 can alternatively be adapted and arranged to selectively engage any of the links 44A, 44B, 44C in the linkage assembly 22 depending on the number and configuration of links necessary for the particular seating environment, as described above, without varying the scope of the invention.

Figure 5A:
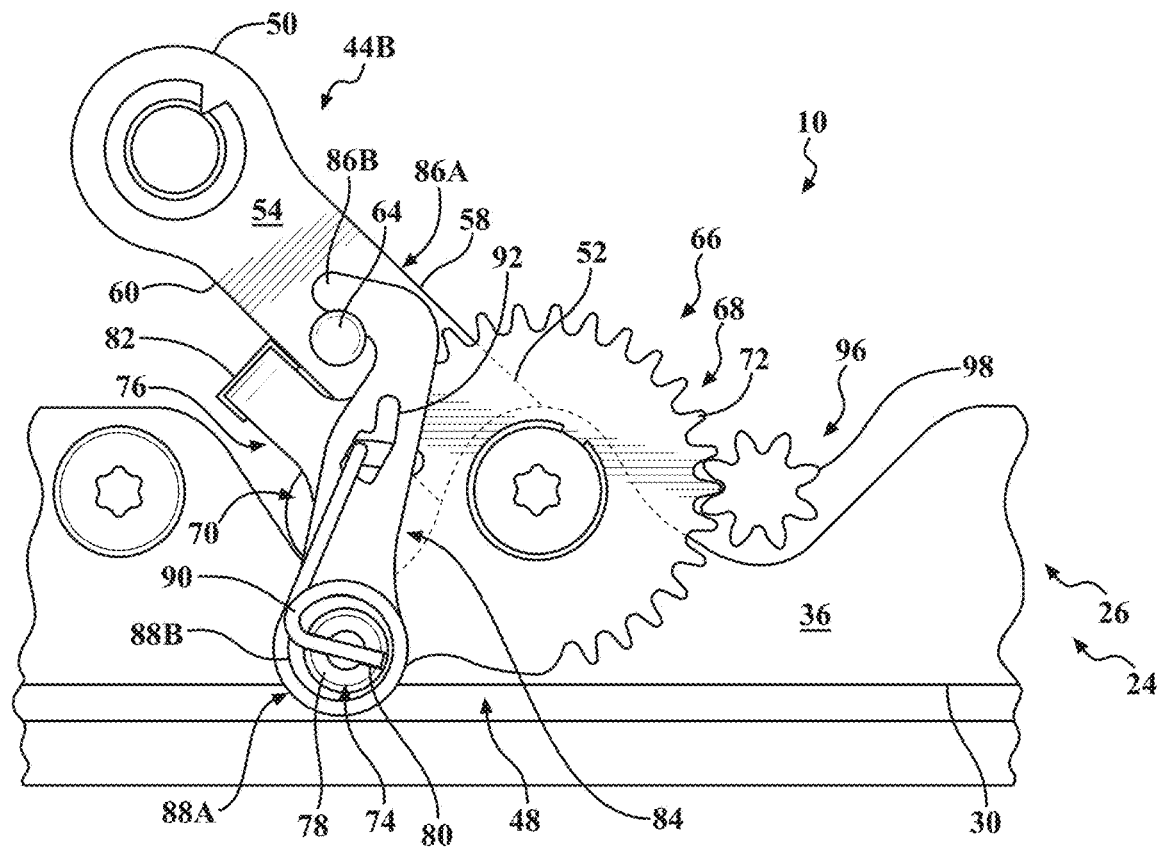
FIG. 5A is an enlarged fragmentary side view of the seat assembly of FIG. 1 showing one of a pair of intermediate links and a detent assembly each coupled to a seat base.
Figure 10:
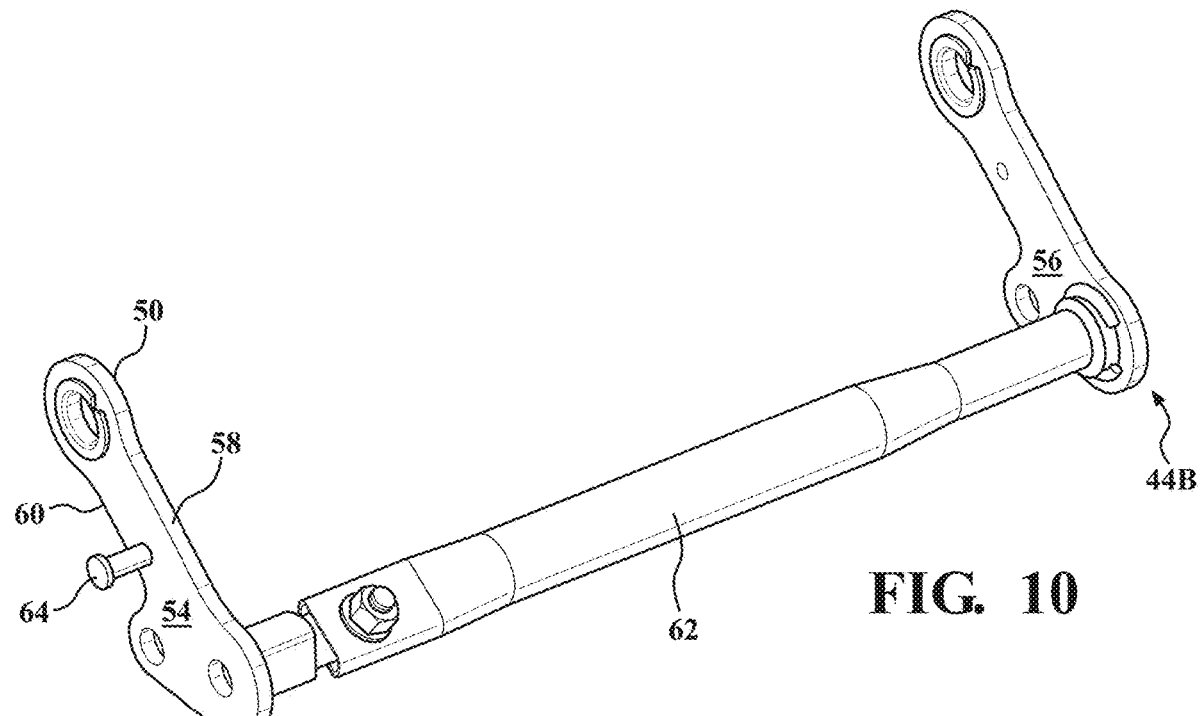
FIG. 10 is an enlarged fragmentary perspective view of the pair of intermediate links of the seat assembly of FIG. 1.

Referring to FIGS. 3, 5A, and 10, the intermediate links 44B extend between a first end 50 and an opposite second end 52. Each of the intermediate links 44B further has an outward-facing lateral side 54 and an inward-facing medial side 56 extending between a front edge 58 and a rear edge 60. The lateral side 54 of each intermediate link 44B at the first end 50 thereof is rotatably coupled to the seat cushion 12, and the lateral side 54 of each intermediate link 44B at the second end 52 thereof is rotatably coupled to the inward-facing side 34 of the respective outer wall 30 on the seat base 24. Referring to FIG. 10, a support bar 62 extends between the second ends 52 of the intermediate links 44B to ensure that the intermediate links 44B positioned adjacent to each lateral side 18 of the seat cushion 12 pivot in tandem during movement of the seat assembly 10. Additionally, a pin 64 extends outwardly from the lateral side 54 of at least one of the intermediate links 44B for selective engagement by the detent assembly 48, the pin 64 positioned generally equidistant between the first and second ends 50, 52 thereof.

Figure 5B:
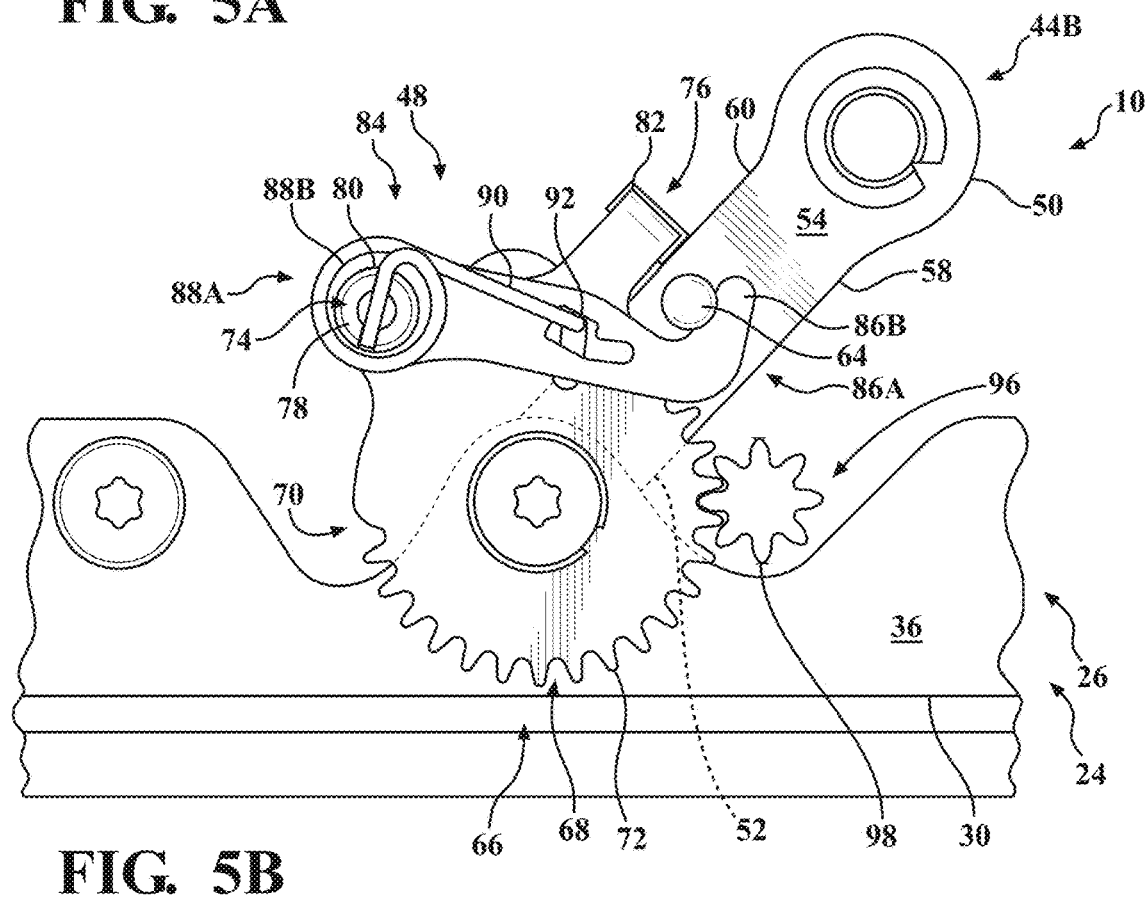
FIG. 5B is an enlarged fragmentary side view of the seat assembly of FIG. 1 showing one of the pair of intermediate links and the detent assembly rotating in a first direction.
Figure 11:
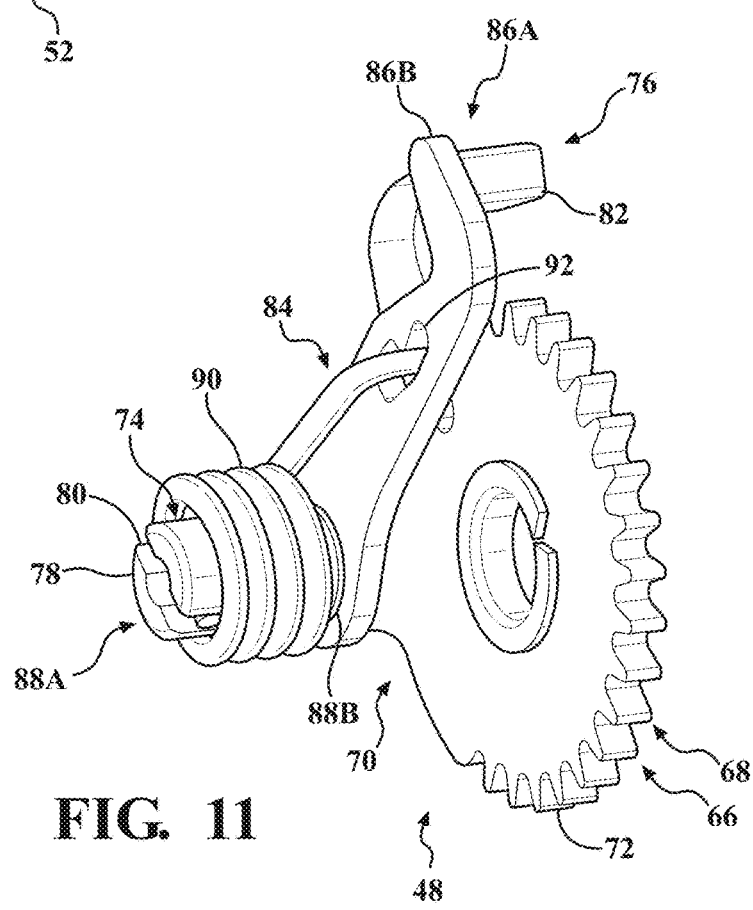
FIG. 11 is an enlarged fragmentary perspective view of the detent assembly of the seat assembly of FIG. 1.

Referring to FIG. 8, the detent assembly 48 includes a sector gear 66 rotatably coupled to the outward-facing side 36 of the outer wall 30 adjacent to the intermediate link 44B having the pin 64 extending therefrom. The sector gear 66 includes a toothed portion 68 opposite a non-toothed portion 70. The toothed portion 68 has a plurality of teeth 72 extending radially outward therefrom, and the non-toothed portion 70 includes a post 74 spaced radially apart from a curved projection 76. Referring to FIGS. 8 and 11, the post 74 extends axially outward from the sector gear 66 and terminates at an outer end 78 having a channel 80 extending therethrough. The curved projection 76 extends radially outward from the sector gear and terminates at an end portion 82 extending axially inward therefrom. The end portion 82 of the curved projection 76 is positioned adjacent to the rear edge 60 of the intermediate link 44B for engaging and pushing the intermediate link 44B in the first direction during rotation of the detent assembly 48 in the first direction when the seat assembly 10 is moving from the design position to the pitch position, as shown in FIGS. 5A and 5B.

The detent assembly 48 further includes a hook element 84 pivotally coupled to the sector gear 66 for selectively coupling the detent assembly 48 to the intermediate link 44B, as shown in FIGS. 8 and 11. The hook element 84 extends between a first end 86A having a rearwardly-extending hook 86B and a second end 88A having a first aperture 88B, the first aperture 88B adapted for receiving the post 74 extending from the sector gear 66 to pivotally couple the hook element 84 to the sector gear 66. The hook element 84 is pivotable between an engaged position wherein the hook 86B is engaged with the pin 64 extending from the intermediate link 44B, as shown in FIG. 9A, to actuate the detent assembly 48 to the use condition, and a disengaged position wherein the hook 86B is disengaged with and spaced from the pin 64 extending from the intermediate link 44B to actuate the detent assembly 48 to the override condition, as shown in FIG. 9C. When in the engaged position, the hook 86B of the hook element 84 is further adapted for pushing the intermediate link 44B in the second direction during rotation of the detent assembly 48 in the second direction when the seat assembly 10 is moving from the pitch position back to the design position. A biasing element 90, such as a torsion spring, is operatively coupled between the channel 80 in the post 74 and a second aperture 92 positioned substantially equidistant between the ends 86A, 88A of the hook element 84. The biasing element 90 has a biasing force for biasing the hook element 84 to the engaged position where the hook 86B is engaged with the pin 64 extending from the intermediate link 44B, thereby retaining the detent assembly 48 in the use condition.

Referring to FIGS. 3, 4, and 8, the seat assembly 10 further includes a conventional linkage motor 94 for pivoting the intermediate link 44B of the linkage assembly 22 to move the seat assembly 10 between the design position and the pitch position during normal operation thereof. The linkage motor 94 is mounted to the seat base 24 generally in front of the detent assembly 48. The linkage motor 94 further includes a pinion gear 96 arranged such that teeth 98 extending radially outward from the pinion gear 96 meshingly engage the teeth 72 extending from the sector gear 66 for selective rotation thereof, as shown in FIGS. 5A, 5B, and 8. Actuation of the linkage motor 94 drives the pinion gear 96 for correspondingly rotating the sector gear 66 of the detent assembly 48 in the first or second direction, thereby correspondingly pivoting the intermediate link 44B in the first or second direction as described above to move the seat assembly 10 between the design position and the pitch position. The seat assembly 10 may further include a control unit operatively coupled to the linkage motor 94 to determine when to stop the linkage motor 94 for correctly positioning the seat assembly 10 in the design position or the pitch position. However, it is to be appreciated that any alternative means of determining when to stop pivoting of the intermediate link 44B and the linkage assembly 22 for positioning the seat assembly 10 in a desired seating position may be used without varying the scope of the invention.

As is known in the art, actuation of the linkage motor 94 for rotating the pinion gear 96 requires a power source, which is typically supplied by the automotive vehicle. Otherwise, the pinion gear 96 is held in its current position, engaged with the sector gear 66, and is unable to rotate. Therefore, when power to the seat assembly 10 and linkage motor 94 is interrupted, such as during an accident involving the vehicle, the linkage motor 94 prevents rotation of the detent assembly 48, which prevents pivoting of the intermediate link 44B and effectively locks the seat assembly 10 in whichever position the seat assembly 10 was disposed before the loss of power. If the seat assembly 10 is disposed in the design position when power is lost, it may be necessary for an occupant to move the seat assembly 10 to the pitch position for increased occupant egress space behind the seat assembly 10 so the occupant can more easily exit the vehicle. In such a situation, actuating the detent assembly 48 from the use condition to the override condition decouples the intermediate link 44B from the detent assembly 48 and the linkage motor 94. The occupant is then able to manually pivot the intermediate link 44B in the first direction independently from the detent assembly 48 and linkage motor 94, as shown in FIG. 9C, by pushing forwardly on any suitable structure of the seat assembly 10, such as the seat back 20, for moving the seat assembly 10 from the design position to the pitch position without actuating the linkage motor 94.

In the first embodiment of the seat assembly 10, shown in FIGS. 1-11, the detent assembly 48 is actuated from the use condition to the override condition during manual movement of the intermediate link 44B in the first direction after a loss of power to the seat assembly 10. In operation, when power to the linkage motor 94 is lost and the occupant needs to exit the vehicle, the occupant first actuates the pull strap 49, shown in FIGS. 6 and 7, to manually release and unlock the latching mechanisms 43 from the respective strikers 45 on the seat base 24. Due to the loss of power, the pinion gear 96 is engaged with the sector gear 66, effectively locking the sector gear 66 and preventing the detent assembly 48 from rotating, as described in further detail above. The occupant then pushes on a suitable structure of the seat assembly 10, such as the seat back 20, which begins to move the intermediate link 44B in the first direction (clockwise when viewed from FIGS. 9A and 9B), causing the pin 64 to push on the hook 86B of the hook element 84 to overcome the biasing force of the biasing element 90. The contact surface on the hook 86B of the hook element 84 is non-cinching, so the pin 64 is able to move relative to the hook 86B. Once the biasing force of the biasing element 90 is overcome by the pin 64 extending from the intermediate link 44B, the pin 64 continues to pivot the hook element 84 from the engaged position to the disengaged position, as shown in FIGS. 9B and 9C, thereby actuating the detent assembly 48 from the use condition to the override condition. Once in the override condition, the pin 64 is spaced from the hook 86B of the hook element 84, and the intermediate link 44B is decoupled from the detent assembly 48 and the linkage motor 94. The intermediate link 44B is free to continue pivoting in the first direction, shown in FIG. 9C, as the occupant continues to push on the suitable structure of the seat assembly 10. Continued manual pivoting of the intermediate link 44B in the first direction moves the seat assembly 10 from the design position to the pitch position, giving the occupant increased egress space behind the seat assembly 10 to more easily exit the vehicle.

Figure 12A:
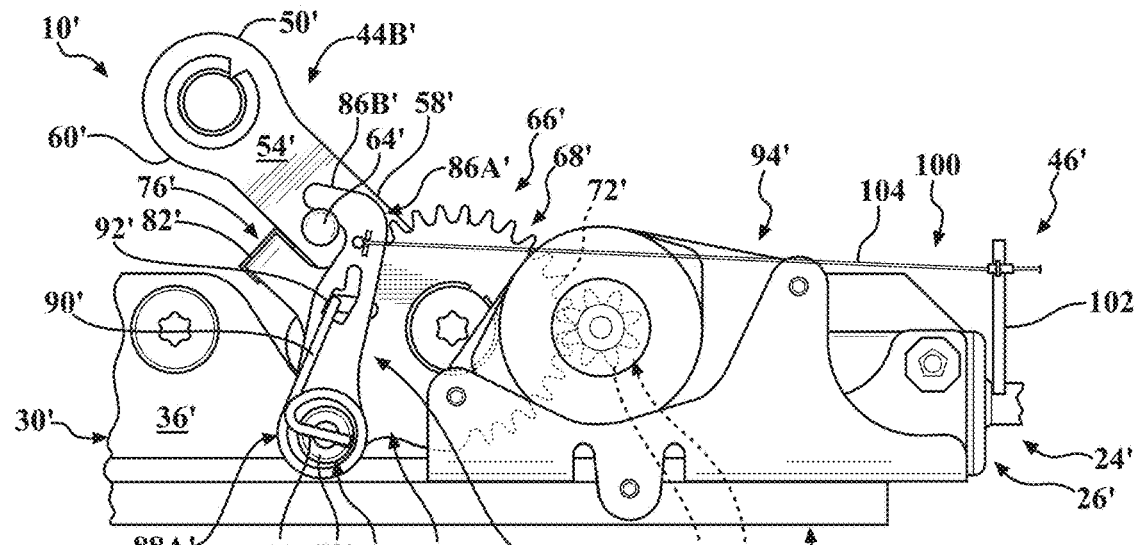
FIG. 12A is an enlarged fragmentary side view of a seat assembly according to a second embodiment of the present invention showing a detent assembly in a use condition.
Figure 12B:
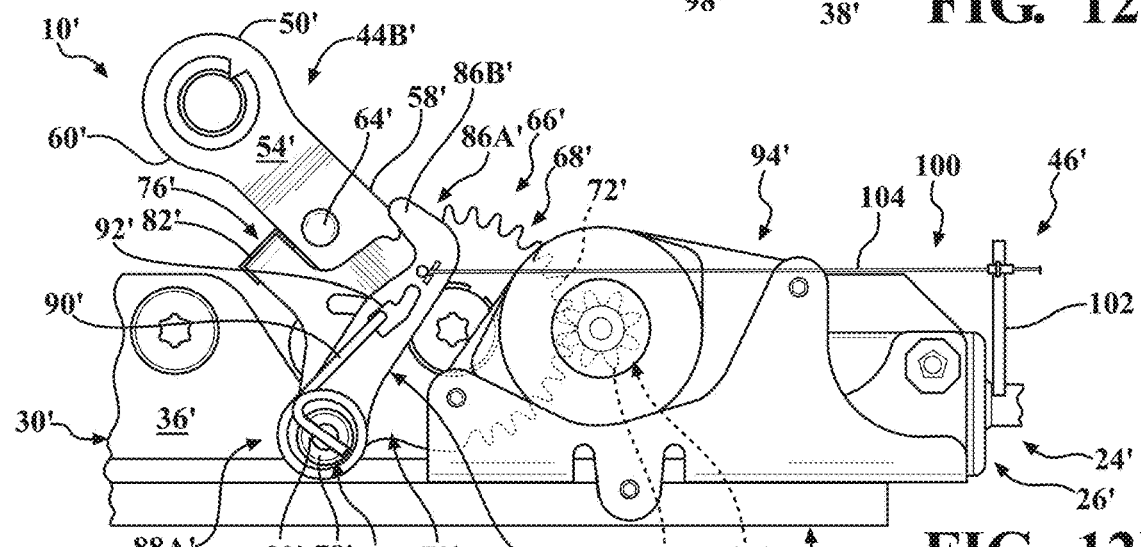
FIG. 12B is an enlarged fragmentary side view of the seat assembly of FIG. 12A showing the detent assembly in an override condition.
Figure 12C:
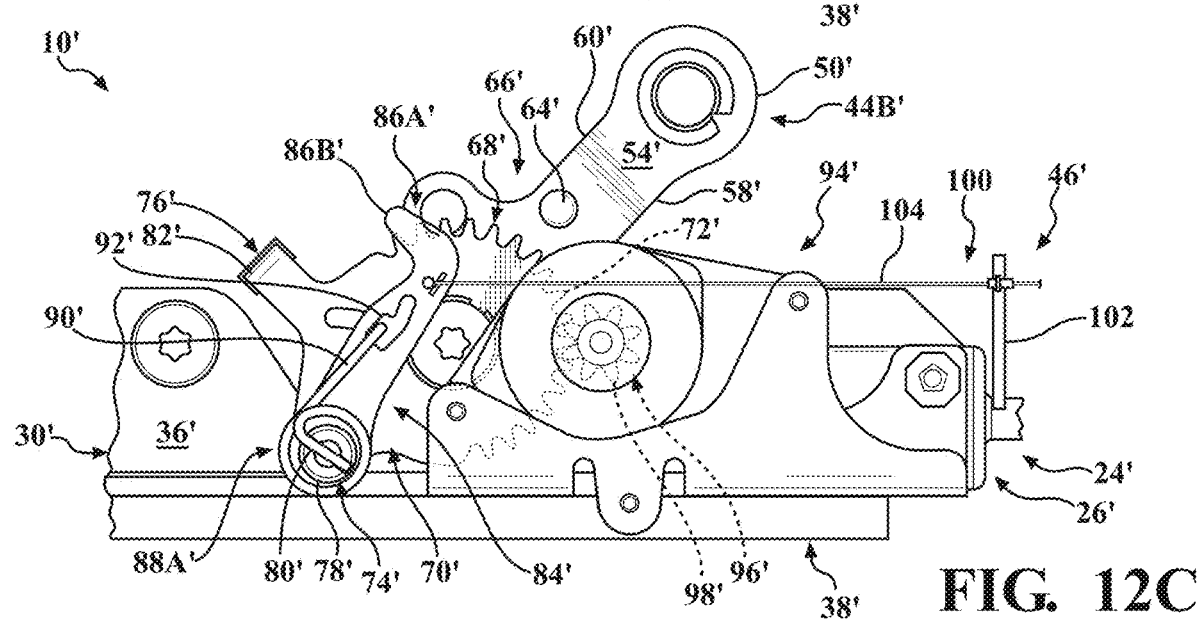
FIG. 12C is an enlarged fragmentary side view of the seat assembly of FIG. 12A further showing the detent assembly in the override condition and one of a pair of intermediate links pivoting in a first direction.
Figure 13:
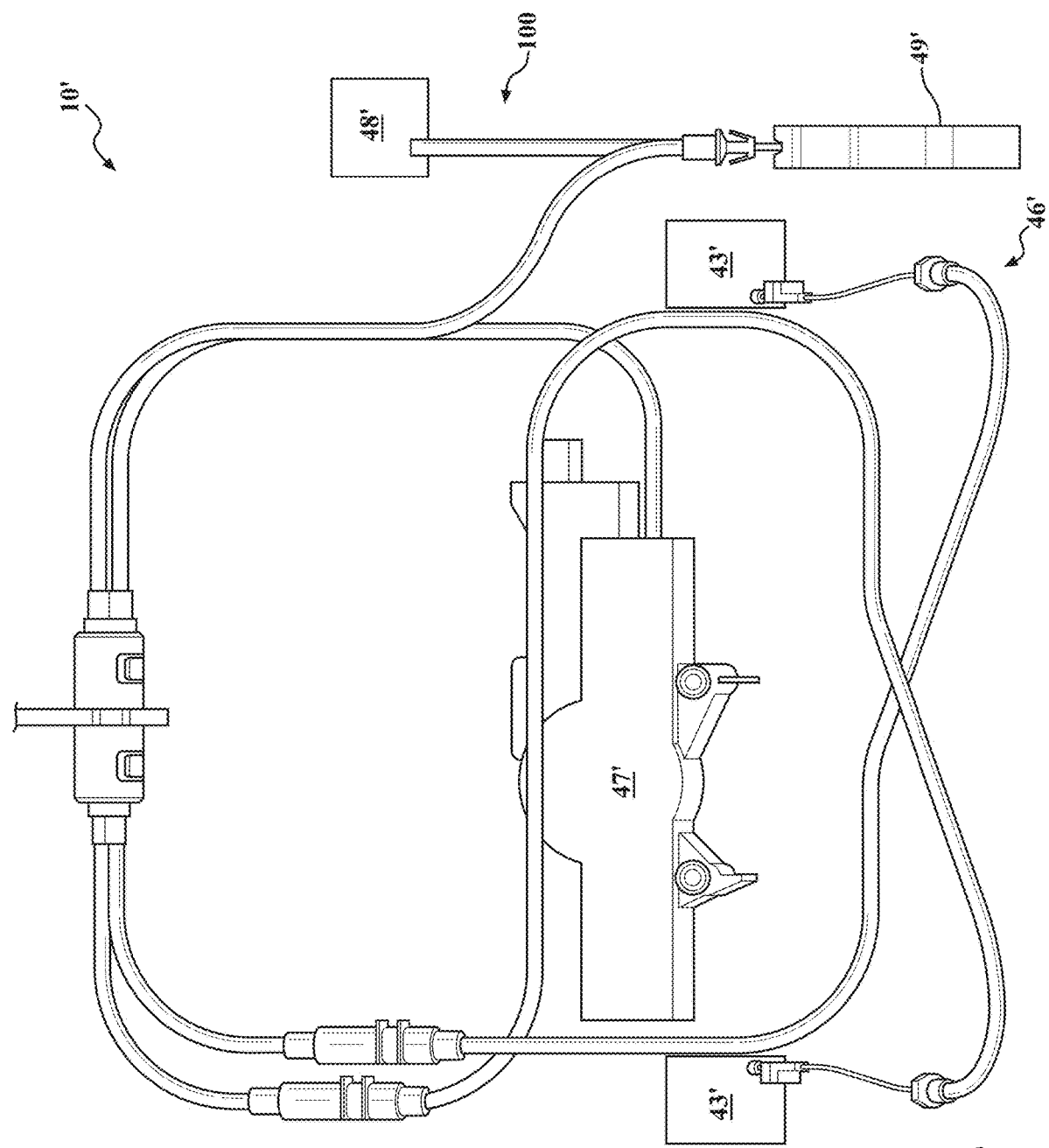
FIG. 13 is a fragmentary top view of a cable assembly of the seat assembly of FIG. 12A.

A second embodiment of the seat assembly 10' is shown in FIGS. 12A-12C and 13, wherein like elements of the second embodiment include primed like element numbers and, as the elements are substantially similar, will not be further explained herein. In the second embodiment of the seat assembly 10', the detent assembly 48' is actuated from the use condition to the override condition in coordination with actuation of the pull strap 49' of the cable assembly 46'. Referring to FIGS. 12A and 13, the cable assembly 46' further includes an additional line 100 for simultaneously pivoting the hook element 84' from the engaged position to the disengaged position. A distal portion 104 of the additional line 100 extends through a post 102 extending upwardly from the seat base 24' and is operatively coupled to the hook element 84' adjacent to the first end 86A' thereof. Therefore, in addition to unlocking the latching mechanisms 43', actuating the pull strap 49' also pivots the hook element 84' from the engaged position to the disengaged position, as shown in FIGS. 12A and 12B, thereby actuating the detent assembly 48' from the use condition to the override condition.

Referring to operation of the second embodiment, when power to the linkage motor 94' is lost and the user needs to exit the vehicle, the user first actuates the pull strap 49', shown in FIGS. 7 and 13. Actuation of the pull strap 49' manually releases and unlocks the latching mechanisms 43' from the respective strikers 45' on the seat base 24'. Actuation of the pull strap 49' also manually pivots the hook element 84' from the engaged position with the pin 64' extending from the intermediate link 44B', as shown in FIG. 12A, to the disengaged position spaced from the pin 64', as shown in FIG. 12B, thereby actuating the detent assembly 48' from the use condition to the override condition. Once in the override condition, the intermediate link 44B' is decoupled from the detent assembly 48' and the linkage motor 94'. The intermediate link 44B' is therefore free to pivot in the first direction, shown in FIG. 12C, as the occupant pushes on the suitable structure of the seat assembly 10', such as the seat back 20'. Continued manual pivoting of the intermediate link 44B' in the first direction moves the seat assembly 10' from the design position to the pitch position, giving the occupant increased egress space behind the seat assembly 10' to more easily exit the vehicle.

The invention has been described in an illustrative manner, and it is to be understood that the terminology which has been used is intended to be in the nature of words of description rather than of limitation. Directional references employed or shown in the description, figures or claims, such as top, bottom, upper, lower, upward, downward, lengthwise, widthwise, longitudinal, lateral, and the like, are relative terms employed for ease of description and are not intended to limit the scope of the invention in any respect. Many modifications and variations of the present invention are possible in light of the above teachings. It is, therefore, to be understood that within the scope of the appended claims, the invention may be practiced other than as specifically described.

What is claimed is:

1. A seat assembly for use in an automotive vehicle, the seat assembly comprising:
   a seat cushion for supporting an occupant in the automotive vehicle and a seat back pivotally coupled to the seat cushion;
   a seat base adapted for mounting the seat assembly within the automotive vehicle;
   at least one link pivotally coupled between the seat cushion and the seat base, wherein pivoting of the at least one link moves the seat assembly between at least a design position, in which the seat assembly is positioned to support an occupant, and a pitch position, in which the seat assembly is tilted toward a floor of the automotive vehicle;
   a detent assembly rotatably coupled to the seat base, the detent assembly actuatable between a use condition in which the at least one link and the detent assembly are operatively coupled, and an override condition for decoupling the at least one link and the detent assembly; and
   a linkage motor operatively engaged with the detent assembly for pivoting the at least one link to move the seat assembly between the design position and the pitch position,
   wherein the override condition of the detent assembly allows for manual pivoting of the at least one link to move the seat assembly between the design position and the pitch position independently of the detent assembly and without use of the linkage motor.

2. The seat assembly of claim 1 wherein the detent assembly includes a sector gear rotatably coupled to the seat base and operatively engaged with the linkage motor.

3. The seat assembly of claim 2 wherein the detent assembly further includes a hook element pivotally coupled to the sector gear, the hook element operable between an engaged position with the at least one link for actuating the detent assembly to the use condition, and a disengaged position with the at least one link for actuating the detent assembly to the override condition.

4. The seat assembly of claim 3 further comprising at least one latching mechanism extending from the seat cushion for removably coupling to the seat base to selectively lock and unlock the seat assembly, thereby selectively preventing and allowing movement of the seat assembly from the design position to the pitch position.

5. The seat assembly of claim 4 further comprising a cable assembly operatively coupled to the at least one latching mechanism, wherein actuation of the cable assembly actuates the at least one latching mechanism to unlock the seat assembly, thereby allowing movement of the seat assembly from the design position to the pitch position.

6. The seat assembly of claim 5 wherein pushing forwardly on the seat assembly when the seat assembly is unlocked pivots the hook element from the engaged position to the disengaged position for actuating the detent assembly from the use condition to the override condition.

7. The seat assembly of claim 5 wherein the cable assembly is further operatively coupled to the hook element, and actuation of the cable assembly also pivots the hook element from the engaged position to the disengaged position for actuating the detent assembly from the use condition to the override condition.

8. The seat assembly of claim 6 wherein the detent assembly further includes a biasing element operatively coupled between the hook element and the sector gear for biasing the hook element to the engaged position to retain the detent assembly in the use condition.

9. The seat assembly of claim 8 wherein the at least one link includes a pin extending laterally therefrom, the hook element of the detent assembly engaged with the pin when in the engaged position and the hook element of the detent assembly disengaged with the pin when in the disengaged position.

10. The seat assembly of claim 9 further comprising a pull strap operatively coupled to the cable assembly, wherein pulling the pull strap actuates the cable assembly to unlock the seat assembly and allow movement of the seat assembly from the design position to the pitch position.

11. The seat assembly of claim 10 wherein the linkage motor further includes a pinion gear operatively coupled with the sector gear of the detent assembly, the linkage motor selectively driving the pinion gear for rotating the sector gear to pivot the at least one link.

12. The seat assembly of claim 11 wherein the sector gear further includes a post for receiving the hook element to pivotally couple the hook element to the sector gear.

13. The seat assembly of claim 12 wherein the sector gear further includes a projection extending adjacent to the hook element and arranged for selectively engaging and pushing the at least one link during rotation of the sector gear.

14. The seat assembly of claim 13 further comprising a seat track assembly fixedly coupled to the seat base for providing fore and aft movement of the seat assembly within the automotive vehicle.

15. The seat assembly of claim 14 wherein the at least one link includes a front link, an intermediate link, and a rear link, the front, rear, and intermediate links each pivotally coupled between the seat cushion and the seat base to move the seat assembly between the design position and the pitch position.

16. The seat assembly of claim 15 wherein the detent assembly is rotatably coupled to the seat base for selectively engaging the intermediate link.

17. The seat assembly of claim 15 wherein the at least one link includes a front link and a rear link to form a four-bar linkage, the front and rear links each pivotally coupled between the seat cushion and the seat base to move the seat assembly between the design position and the pitch position.

* * * * *